United States Patent
Ehler et al.

(10) Patent No.: US 8,973,778 B2
(45) Date of Patent: Mar. 10, 2015

(54) SELF-ADJUSTING CONNECTOR

(71) Applicant: TI Automotive Technology Center GmbH, Rastatt (DE)

(72) Inventors: Alex Ehler, Rastatt (DE); Patrick Gmuend, Karlsruhe (DE); Bernd M. Nickel, Karlsruhe (DE)

(73) Assignee: TI Automotive Technology Center GmbH, Rastatt (DE)

( * ) Notice: Subject to any disclaimer, the term of this patent is extended or adjusted under 35 U.S.C. 154(b) by 0 days.

(21) Appl. No.: 14/060,652

(22) Filed: Oct. 23, 2013

(65) Prior Publication Data
US 2014/0117023 A1    May 1, 2014

Related U.S. Application Data

(60) Provisional application No. 61/719,749, filed on Oct. 29, 2012.

(51) Int. Cl.
*B60K 15/067*    (2006.01)

(52) U.S. Cl.
USPC .............................. 220/562; 220/563; 403/220

(58) Field of Classification Search
CPC ................................ B29C 49/20; B29C 65/70
USPC ................. 220/564, 563, 562, 653, 651, 652; 403/220
See application file for complete search history.

(56) References Cited

U.S. PATENT DOCUMENTS

| | | | | |
|---|---|---|---|---|
| 2,860,809 A | * | 11/1958 | Perry | 220/563 |
| 6,138,859 A | * | 10/2000 | Aulph et al. | 220/563 |
| 7,748,397 B2 | | 7/2010 | Firtion et al. | |
| 8,122,604 B2 | | 2/2012 | Jannot et al. | |
| 8,584,339 B2 | | 11/2013 | Mbog et al. | |
| 2005/0284872 A1 | * | 12/2005 | Gombert et al. | 220/562 |
| 2008/0061470 A1 | | 3/2008 | Borchert et al. | |
| 2009/0230133 A1 | * | 9/2009 | Takeuchi et al. | 220/562 |
| 2010/0212806 A1 | * | 8/2010 | Lemoine et al. | 156/92 |

FOREIGN PATENT DOCUMENTS

| | | |
|---|---|---|
| DE | 102006059799 A1 | 6/2008 |
| EP | 0875411 A2 | 4/1998 |
| FR | 2897308 A1 | 8/2007 |
| FR | 2918595 A1 | 1/2009 |

(Continued)

OTHER PUBLICATIONS

EP Extended European Search Report dated Feb. 19, 2014 (6 pages).

*Primary Examiner* — Stephen Castellano
(74) *Attorney, Agent, or Firm* — Reising Ethington P.C.

(57) ABSTRACT

A self-adjusting connector for attaching a fuel tank accessory component to a wall of a fuel tank includes a mounting portion, a flange portion and a load-accommodating portion. The mounting portion is adapted to be attached to a wall of a fuel tank at an attachment site The flange portion is adapted to be attached to a fuel tank accessory component. And the load-accommodating portion is situated between the mounting portion and the flange portion and permits the mounting portion and the flange portion to move relative to one another. In at least some implementations, the relative movement permits loads applied by the fuel tank wall, such as due to temperature or other changes in the wall, to be accommodated without undue stress on the accessory component or undue reaction forces on the tank wall.

15 Claims, 3 Drawing Sheets

(56) References Cited

FOREIGN PATENT DOCUMENTS

| WO | WO03053731 A1 | 7/2003 |
| WO | WO2009043660 A2 | 4/2009 |
| WO | WO2009125008 A1 | 10/2009 |

* cited by examiner

SELF-ADJUSTING CONNECTOR

REFERENCE TO CO-PENDING APPLICATION

This application claims the benefit of U.S. Provisional Patent Application Ser. No. 61/719,749 filed Oct. 29, 2012, which is incorporated herein by reference in its entirety.

TECHNICAL FIELD

The present disclosure relates generally to liquid receptacles and connectors that may be used to attach accessory components to those receptacles.

BACKGROUND

Liquid receptacles may be used by a variety of industries. For example, the automotive industry may rely on a vehicle-mounted fuel tank to store fuel. That fuel may be consumed by an engine or other fuel-consuming device to generate power for operating the vehicle. To help monitor the fuel stored in the fuel tank and deliver it to the engine (or other device), as well as perform any other appropriate functions, various fuel tank accessory components may be carried by the fuel tank. These components may be attached to, or otherwise held in place by, a wall of the fuel tank.

SUMMARY

A self-adjusting connector for attaching a fuel tank accessory component to a wall of a fuel tank includes a mounting portion, a flange portion and a load-accommodating portion. The mounting portion is adapted to be attached to a wall of a fuel tank at an attachment site The flange portion is adapted to be attached to a fuel tank accessory component. And the load-accommodating portion is situated between the mounting portion and the flange portion and permits the mounting portion and the flange portion to move relative to one another. In at least some implementations, the relative movement permits loads applied by the fuel tank wall, such as due to temperature or other changes in the wall, to be accommodated without undue stress on the accessory component or undue reaction forces on the tank wall.

A liquid receptacle may include a wall that defines an interior space, an accessory component located within the interior space, and a plurality of self-adjusting connectors that attach the accessory component to the wall. Each of the self-adjusting connectors includes a mounting portion attached to the wall at an attachment site, a flange portion attached to the accessory component, and a load-accommodating portion situated between the mounting portion and the flange portion. The load-accommodating portion permitting the mounting portion and the flange portion of each self-adjusting connector to move relative to one another and also permitting limited relative movement between the mounting portions of the self-adjusting connectors. In at least some implementations, an accessory component may be attached to the receptacle wall at multiple locations and movement of the wall at these multiple locations may be accommodated.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
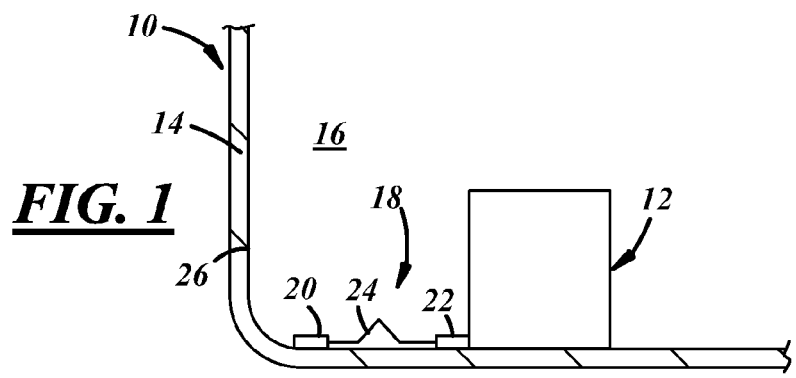
FIG. 1 is a generalized schematic illustration of a liquid receptacle and an accessory component attached to the liquid receptacle by a self-adjusting connector.

Referring in more detail to the drawings, FIG. 1 is a generalized schematic illustration of a liquid receptacle 10 and an accessory component 12 carried by the receptacle 10. The liquid receptacle 10 may be a fuel tank for an automotive vehicle—in which case the accessory component is a fuel tank accessory component—or it may be some other specific type of liquid receptacle. If the liquid receptacle 10 is a fuel tank, as will be described from this point forward, it generally includes a fuel tank wall 14 that defines an interior space 16 for holding fuel. And the number of fuel tank accessory components 12 that may be carried by the fuel tank 10 are numerous. They may include, for example, a fuel pump module disposed inside the fuel tank 10 for pumping fuel out of the tank 10, a baffle located inside the fuel tank 10 for managing fuel slosh, fuel or vapor conduits, vent valves, and vapor canisters, to name but a few such components. These various components may be made from any suitable plastic or metal material.

The fuel tank wall 14 may have any desirable composition. One example of a fuel tank wall 14 is a plastic structure that is designed to minimize fuel vapor permeation through the wall 14. The plastic structure may include one or more layers of high-density polyethylene (HDPE), at least one fuel vapor barrier layer such as, for example, ethylene vinyl alcohol (EVOH), and a binder layer that joins the HDPE layer and the fuel barrier layer. One such fuel tank wall construction can be found in US2003/0198768, the disclosure of which is incorporated herein, in its entirety, by reference. Other constructions of the fuel tank wall 14 may also be employed as will be appreciated by skilled artisans. The fuel tank wall 14, moreover, may have a thickness that typically—but does not have to—ranges from about 2 mm to about 7 mm. The fuel tank wall 14 may be fabricated into its final shape by any suitable tank-forming procedure including blow-molding.

The fuel tank accessory component 12 may be attached to the fuel tank wall 14 by a self-adjusting connector 18. The self-adjusting connector 18 is designed to autonomously accommodate applied loads that may develop during manufacture and/or use of the fuel tank 10 and which may affect the attachment of the fuel tank accessory component 12 to the fuel tank wall 14. These applied loads can be the type that a rigid connector would have more difficulty tolerating and, as a result, might cause one or more of the tank wall 14, the rigid connector, and the fuel tank accessory component 12 to unduly fatigue, break, or otherwise suffer some type of stress-related malfunction. In terms of its general structure, as shown schematically in FIG. 1, the self-adjusting connector 18 may include a mounting portion 20, a flange portion 22, and a load-accommodating portion 24 situated between the mounting portion 20 and the flange portion 22.

The mounting portion 20 may include a foot (and may hereafter be called a "foot portion") adapted for attachment to the fuel tank wall 14 at an attachment site 26. Any known type of attachment mechanism may be employed to facilitate such attachment. For example, the foot portion 20 may have an end that is weldable to the tank wall 14; that is, all or some of the foot portion 20 may be adequately sized to support a welding joint and, additionally, be formed of a material that can undergo welding to the tank wall 14 by the desired welding procedure. The foot portion 20 may also include a flange or other appendage around which the tank wall 14 can be formed so that a portion of the tank wall overlaps or traps at least part of the foot portion. And still further, the foot portion 20 may interact with (e.g., be received in, be press-fit with, be interference-fit with, be threaded with, etc.) a corresponding feature defined by the tank wall 14 or present on an attachment device secured to the fuel tank wall 14.

The flange portion 22 is adapted for attachment to the fuel tank accessory component 12. And much like the foot portion 20, any known type of attachment mechanism may be employed. For example, in one implementation, the flange portion 22 may be an integral extension of the fuel tank accessory component 12. In this way, the self-adjusting connector 18 may be integrally attached to the fuel tank accessory component 12 by way of the flange portion 22, such as by making the flange portion 22 an extension of a housing or body of the fuel tank accessory component 12, with these features being formed from the same piece of material. In other implementations, however, the flange portion 22 may be separate from the fuel tank accessory component 12 and be attached by any of the known mechanisms previously mentioned for the foot portion 20. Such implementations would make the self-adjusting connector 18 a distinct structure from both the fuel tank wall 14 and the fuel tank accessory component 12.

The load-accommodating portion 24 may be integrally connected to the foot portion 20 and the flange portion 22. The load-accommodating portion 24 is constructed to permit the foot portion 20 and the flange portion 22—and, consequently, the foot portion 20 and the fuel tank accessory component 12—to move relative to one another in response to an applied load. Such relative movement between the foot portion 20 and the flange portion 22 may be in any direction up to about 20%—and often by about 2% to about 5%—and is reversible (i.e., not permanent), where the percentage is stated as a percent change in position between unloaded static state and a flexed or displaced state. In at least some implementations, the foot portion 20 and flange portion 22 may permit relative movement between them of up to 30 mm while exerting a force on the fuel tank wall 14 of less than 40 N. This type of reversible relative movement can be experienced when a load of about 5 N to about 50 N, and in some instances between about 10 N and 20 N, is exerted on the load-accommodating portion 24. A few implementations of the load-accommodating portion 24 that can provide this degree of flexibility include a flat spring having one or more return-bends between the foot portion 20 and the flange portion 22—an implementation that is shown in more detail in FIGS. 2-5—a helical compression spring, and a compliant elastomeric material or other resilient polymeric.

Figure 2:
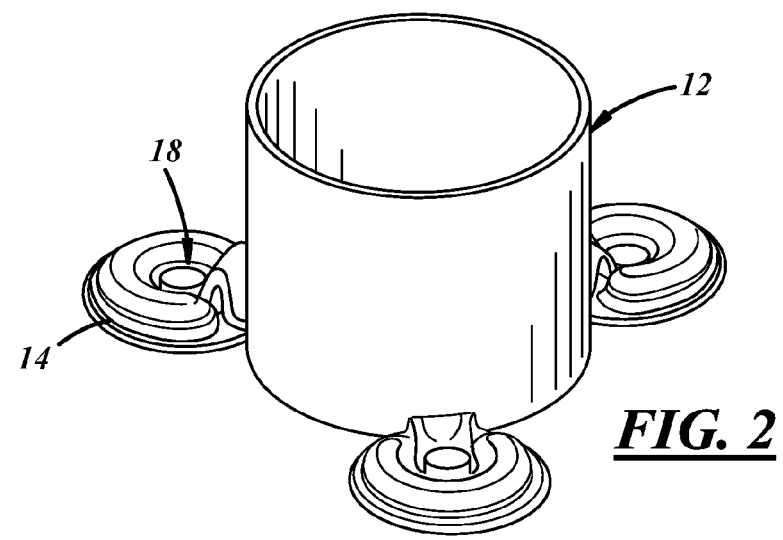
FIG. 2 is a generalized perspective illustration showing one implementation of the self-adjusting connector, a plurality of which are used to attach a fuel tank accessory component to a fuel tank wall.

Referring now to FIG. 2, the fuel tank accessory component 12 may be attached to the fuel tank wall 14 by a plurality of self-adjusting connectors 18. Each of the plurality of connectors 18 may integrally extend from, and be part of, a bracket or housing of the fuel tank accessory component 12, but they do not necessarily have to be integrated in this manner. The plurality of self-adjusting connectors 18 may be spaced relative to one another so that the fuel tank accessory component 12 can be held steadily in place within the fuel tank 10. And the ability of the self-adjusting connectors 18 to autonomously respond to applied loads, as described in more detail below, helps mitigate stresses that might otherwise develop in the fuel tank wall 14 and/or the fuel tank accessory component 12 under any of a variety of circumstances. Several of these load-inducing circumstances include, for example, expansion and/or contraction of the fuel tank wall 14 and/or the fuel tank accessory component 12, differences in the materials from which the fuel tank wall 14 and the fuel tank accessory component 12 are made, differences in the contour of the fuel tank wall 14 at the various attachment sites 26, differences in the shape and/or composition of the fuel tank accessory component 12 at or near the areas where the flange portions 22 of the connectors 18 connect to the accessory component 12, and other types of factors known to skilled artisans.

Figure 3:
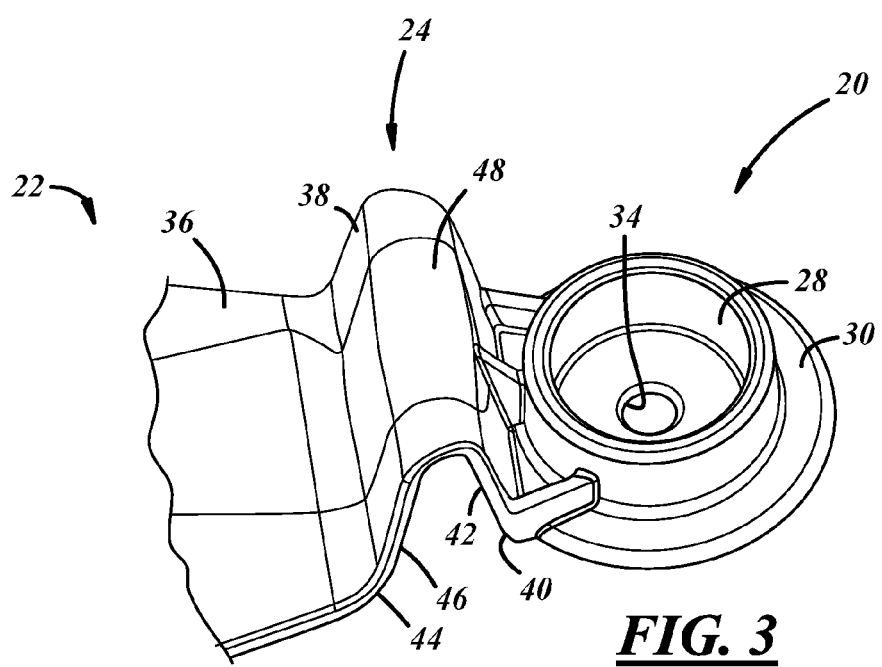
FIG. 3 is a perspective view of one of the self-adjusting connectors shown in FIG. 2.
Figure 4:
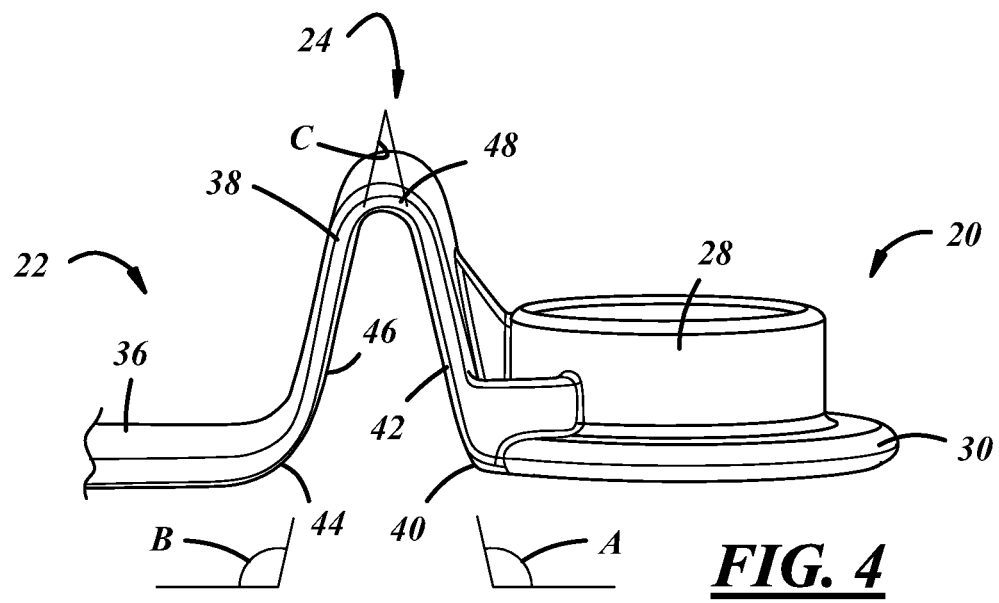
FIG. 4 is a side elevational view of the self-adjusting connector shown in FIG. 3.
Figure 5:
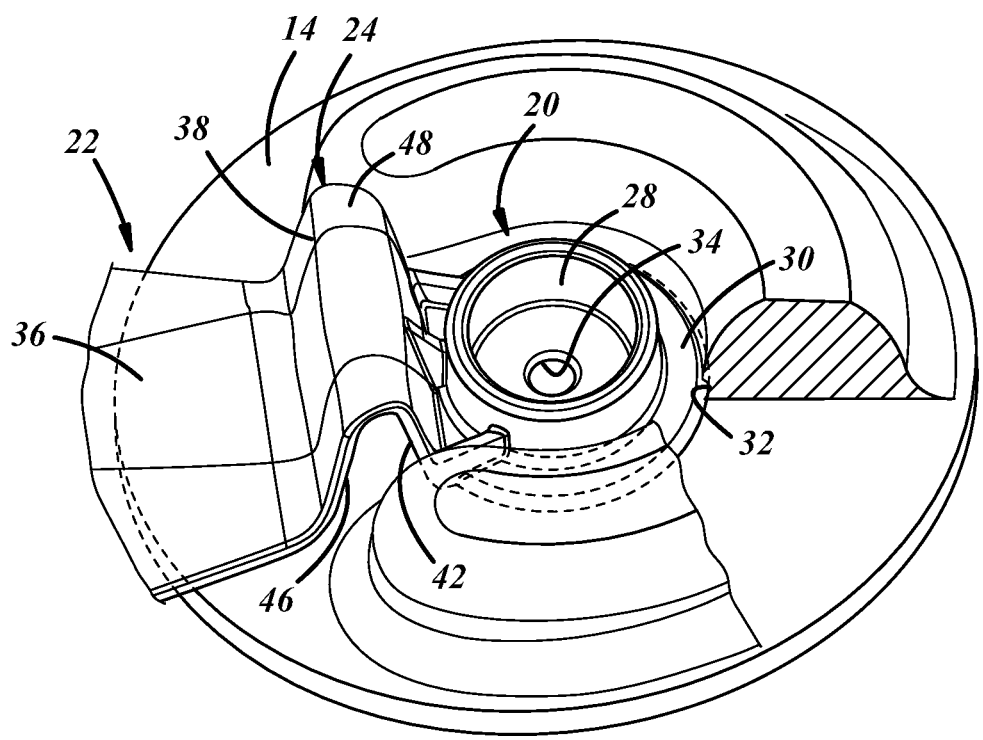
FIG. 5 is a perspective view of the self-adjusting connector shown in FIG. 3 with the foot portion attached to the fuel tank wall at an attachment site.

One or more of the plurality of self-adjusting connectors 18 may be constructed as shown in FIGS. 3-5. Here, the foot portion 20 includes a body 28 that may be round, such as the generally axially-extending cylindrical wall shown, or may be some other shape. The foot portion 20 may also have a flange 30 extending outwardly from the body 28 and adapted to mate with a complimentary groove 32 defined within the fuel tank wall 14. This groove 32 may be formed by folding part of the fuel tank wall 14 around the flange 30 when the wall 14 is softened during manufacture of the fuel tank 10. Or it may be pre-formed in the wall 14. The groove 32 does not necessarily have to be present though. The flange 30 may be heat welded to the wall 14 or secured in some other manner that does not require the groove 32 to be present. The body 28 may also include an opening 34. The opening 34 may be constructed to receive a pre-located mounting feature, such as a protruding piece of the fuel tank wall 14, to help secure the foot portion 20 to the fuel tank wall 14. Or the opening 34 may be present to receive a softened portion of the fuel tank wall 14—as a result of the body 28 being pressed against the fuel tank wall 14 after being heated to force a portion of the softened fuel tank wall 14 through the opening 34—to help secure the foot portion 14 to the fuel tank wall 14. At the other end of the self-adjusting connector 18, the flange portion 22 includes a tab 36 that is integrally formed with, and extends from, the fuel tank accessory component 12. This tab 36 may be planar, as shown, or it may have some other suitable profile.

In this implementation, the load-accommodating portion 24 includes a flat spring 38 that is integrally connected to the body 28 and the tab 36. The flat spring 38 comprises a first bend 40 that transitions from the foot portion 20, a first leg 42 that transitions from the first bend 40 and projects away from the body 28 at an angle A, a second bend 44 that transitions from the tab 36, and a second leg 46 that transitions from the second bend 44 and projects away from the tab 36 at an angle B. The flat spring 38 also comprises a return-bend 48 that joins the first and second legs 42, 46 at an angle C when the flat spring 38 is at rest and is not being acted upon by a load. Of course, when the flat spring 38 is acted upon by some applied load, this angle (angle C) may decrease to a narrower range or increase to a wider range. The various angles A, B, C are each selected to allow the desired amount of relative movement between the foot portion and the flange portion, as mentioned above, to occur when loaded.

The term "return-bend" as used here refers to a bend that joins the first and second legs 42, 46 and also provides a flexible junction that permits the first and second legs 42, 46 to move relative to one another when a load acts on the self-adjusting connector 18. The types of relative movement accommodated by the return-bend 48 may involve displacement of the first and second legs 42, 46 towards one another (angle C decreases), displacement of the first and second legs 42, 46 away from one another (angle C increases), twisting of the first and second legs 42, 46 (angle C remains generally the same), or some combination of twisting and either inward or outward displacement of the first and second legs 42, 46. Any of a variety of events, as previously mentioned, can impart a load to the self-adjusting connector 18 including thermally- or mechanically-induced expansion or contraction of the fuel tank wall 14 and/or the fuel tank accessory component 12. Such expansions and contractions may be more pronounced when the wall 14 and the component 12 are made from different materials that have different physical properties.

In operation, and referring back to FIG. 2, the plurality of the self-adjusting connectors 18 may be used to attach the fuel tank accessory component 12 to the fuel tank wall 14. The flange portion 22 of each self-adjusting connector 18 is attached to the accessory component 12—preferably by being integrally formed with at least a portion of the component 12—and the foot portion 20 is attached to the fuel tank wall 14 at the attachment site 26. Attaching the fuel tank accessory component 12 to the fuel tank wall 14 may occur whenever it is convenient to make the attachment(s). The accessory component 12 may even be attached during manufacture of the fuel tank 10 at a time when the fuel tank wall 14 still has to cool and undergo additional dimensional shrinkage to attain its final shape.

For example, the fuel tank 10 may be formed by a blow-molding process in which a molten parison of plastic material (which may be co-extruded to include multiple layers) is positioned within a mold cavity defined by one or more mold sections. The mold cavity is contoured to define a desired exterior shape of the fuel tank 10. A fluid, such as air, is then provided under pressure within the interior of the molten parison to expand the parison into engagement with the mold cavity. Next, the expanded parison—now considered to be the fuel tank wall 14, although slightly larger—may be cut, torn, or otherwise split to permit access to its interior before being cooled. At this point, with the mold sections opened to expose the interior of the now-breached fuel tank wall 14, which is still somewhat warm, the accessory component 12 may be inserted into what will eventually become the interior space 16 of the fuel tank 10 and be attached to the fuel tank wall 14. The mold sections may then be closed to rejoin the fuel tank wall 14 so that it may be further cooled to derive the final, operational fuel tank 10 in which fuel may be received.

Figure 6:
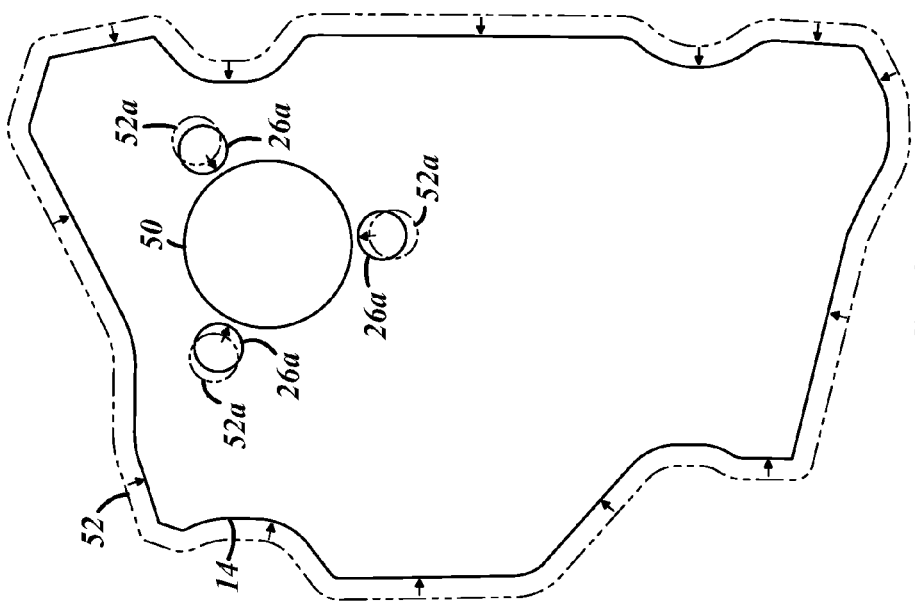
FIG. 6 is a generalized schematic illustration of a fuel tank, which includes a fuel tank wall that may undergo dimensional shrinkage during manufacture, and a fuel tank accessory component located inside the fuel tank and attached to the fuel tank wall by a plurality of self-adjusting connectors.

The fuel tank wall 14, however, may undergo dimensional shrinkage in all directions by up to 3%, and sometimes more, when it cools. Such shrinking of the fuel tank wall 14 has a tendency to exert a load and movement to one or more of the self-adjusting connectors 18. For example, as shown in FIG. 6, a fuel pump module 50 may be inserted into an expanded parison wall 52 (a term used here in FIG. 6 to denote the fuel tank wall 14, when warm, and before undergoing dimensional shrinkage to its final form), in the manner described above, and be attached at a plurality of initial attachment sites 52a with one connector 18 being used at each site 52a. These initial attachment sites 52a may be selected to try and account for subsequent shrinkage of the expanded parison wall 52 or they may not. Then, upon cooling and associated shrinkage of the expanded parison wall 52 during formation of the fuel tank 10, the plurality of initial attachment sites 52a may move inward to a plurality of final attachment sites 26a, while the fuel pump module 50 remains in generally the same location.

The self-adjusting connector 18 associated with each attachment site 26 permits its foot portion 20 to autonomously move with the shrinking fuel tank wall 14 relative to the fuel pump module 50. This movement is accommodated by flexing, twisting, or some other relative movement in the load-accommodating portion 24. The reaction of the self-adjusting connectors 18 when the fuel tank wall 14 shrinks during cooling is able to entertain any loads—even those of diverse magnitudes—that may be exerted on the connectors 18 without stressing the fuel tank wall 14 and/or the fuel tank accessory component 12 (i.e., the fuel pump module 50 in FIG. 6). Dimensional shrinkage of the fuel tank wall 14 may therefore be accommodated by the plurality of self-adjusting connectors 18, through permitted relative movement of their load-accommodating portions 22, to a greater extent than a set of rigid connectors that do not incorporate such self-adjustability.

Figure 7:
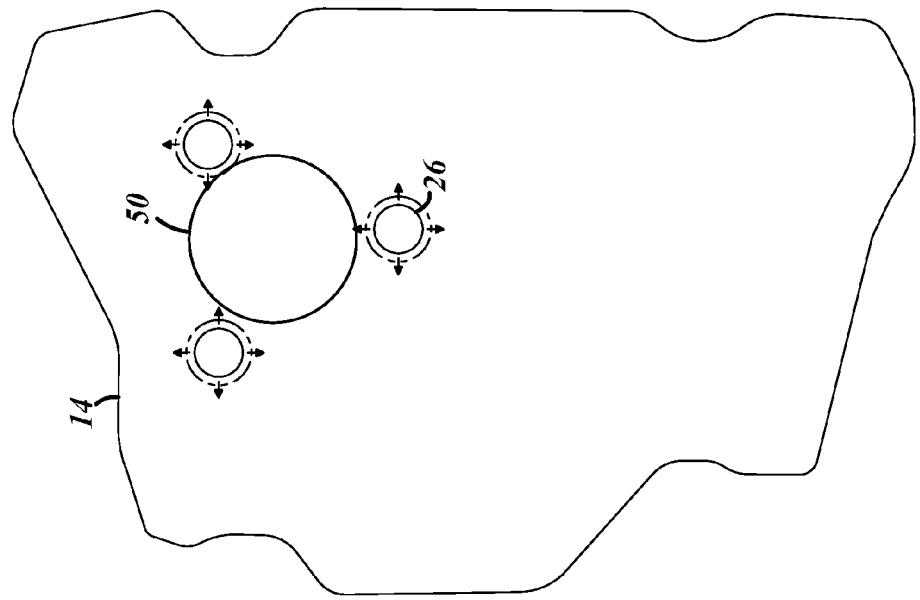
FIG. 7 is a generalized schematic illustration of a fuel tank, which includes a fuel tank wall, and a fuel tank accessory component located inside the fuel tank and attached to the fuel tank wall by a plurality of self-adjusting connectors, in which one or more of the fuel tank wall, the self-adjusting connectors, and the fuel tank accessory component may swell when soaked with fuel and contract when no longer soaked with fuel.

The self-adjusting connectors 18 may also be helpful in entertaining loads that develop when the fuel tank 10 is used on a vehicle. For example, referring now to FIG. 7, various portions of the fuel tank wall 14 and the fuel pump module 50, as well as the several connectors 18, may be soaked with fuel, and then dried, then soaked with fuel again, and so on, as the fuel level fluctuates within the fuel tank 10. Soaking and drying of the fuel tank wall 14, the connectors 18, and the fuel pump module 50 may cause those structures to swell and contract, possibly to different extents, and may result in size differences of around 1% or greater. Such cyclical deviations in the size of the fuel pump module 50 and the connectors 18, as well as the fuel tank wall 14, may affect the location of the attachment sites 26 relative to each other and the fuel pump module 50. In some instances, as shown in FIG. 7, the attachment sites 26 may grow (as shown by the dashed circles) as a result of swelling in the foot portion 20, move relative to the fuel pump module 50 (as shown by the arrows), and/or move away from each other, thus imparting a load to the self-adjusting connectors 18. Swelling and contraction of the fuel tank wall 14, the connectors 18, and the fuel pump module 50 may be induced by temperature differences between these structures 12, 14, 18 and the fuel stored in the fuel tank 10, such as when cold fuel is first pumped into a warmer fuel tank 10, and vice versa. Swelling and contraction of the fuel tank wall 14, the self-adjusting connectors 18, and the fuel tank accessory component 12 may also be provoked by variances in the ambient temperature surrounding the fuel tank 10 (e.g., usually in the range of about −30° C. to about 130° C.).

The self-adjusting connectors 18 may autonomously entertain any loads that develop due to swelling and contracting of the fuel tank wall 14 and the fuel tank accessory component 12 in the same manner as before; that is, the load-accommodating portion 24 permits the foot portion 20 to move with the fuel tank wall 14, and relative to the flange portion 22, when subjected to an applied load. The self-adjusting connector 18 is useful in this regard because it can effectively tolerate cyclically-imparted loads over and over again in a wide range of operating conditions without unduly stressing the tank wall 14 and or the accessory component 12. Such stress relief may be helpful in minimizing localized fatigue, cracking, or other types of structural defects in the fuel tank wall 14 around the attachment site 26 and/or in the accessory component 12 at or near the flange portion 22. In at least some implementations, the foot portions of two self-adjusting connectors may move relative to each other up to about 30 mm, and this movement may be in any direction such that the foot portions may become closer, further apart, skewed or otherwise positioned.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A liquid receptacle comprising:
a wall of a plastic material that defines an interior space;
an accessory component located within the interior space; and
a plurality of self-adjusting connectors of a resilient plastic material that attach the accessory component to the wall, wherein each of the self-adjusting connectors includes a mounting portion with a foot attached to the wall at an attachment site, a flange portion connected to the accessory component, and a load-accommodating portion between the foot and the flange portion, the load-accommodating portion having a first bend that transitions from the foot to a first leg projecting away from the foot at a first angle, a second bend that transitions from the flange portion to a second leg that projects away from the flange portion and a return bend flexibly joining the first and second legs at a third angle and permitting the first and second legs to move relative to one another; and the load-accommodating portion permitting the foot and the flange portion of each self-adjusting connector to move relative to one another by at least 5% between an unloaded state and a flexed or displaced state without permanent deformation of the load-accommodating portion while exerting a force on the wall of less than 40 N, and also permitting limited relative movement between spaced-apart feet of the mounting portions of the plurality of self-adjusting connectors.

2. The receptacle of claim 1 where the flange portion of each of the self-adjusting connectors is attached to a housing of the accessory component.

3. The receptacle of claim 2 wherein the flange portions of the self-adjusting connectors are spaced apart and extend from the housing in different directions.

4. The receptacle of claim 2 wherein the housing is an integral component of the accessory component rather than a separate bracket that carries the accessory component.

5. The receptacle of claim 1 wherein the load-accommodating portions of the self-adjusting connectors permit the mounting portions of the self-adjusting connectors to move relative to each other due to changes in the wall that cause movement of the mounting portions.

6. The receptacle of claim 1 wherein the mounting portions include a body adapted to mate with complementary features formed in the fuel tank wall to permit installation of the accessory component to the wall of the liquid receptacle after the wall is molded.

7. The receptacle of claim 1 wherein the mounting portion includes an opening, and a portion of the wall is received in the opening.

8. The receptacle of claim 1 wherein the load-accommodating portions include a flat spring with the return bend therein to permit relative movement of its respective mounting portion and flange portion.

9. The receptacle of claim 1 wherein the flange portion is integral with the accessory component.

10. The receptacle of claim 1 wherein the flange portion is of the same plastic material as a housing of the accessory component.

11. The receptacle of claim 1 wherein the load-accommodating portion of each of the self-adjusting connectors permits relative movement between the foot portion and the flange portion thereof by up to 20% between an unloaded static state and a flexed state.

12. The receptacle of claim 1 wherein the load-accommodating portions of the self-adjusting connectors permit relative movement between the spaced-apart feet thereof by up to 30 mm.

13. The receptacle of claim 1 further comprising a housing of the accessory component and the flange portions of the self-adjusting connectors extend from the housing in different directions.

14. The receptacle of claim 13 wherein the housing and the self-adjusting connectors are one piece and of the same plastic material.

15. The receptacle of claim 1 further comprising a hole through the foot of at least one of the self-adjusting connectors, a portion of the wall received in the hole, and a wall of the foot encircling and spaced from the hole and projecting from the foot and away from the wall portion to which the foot is attached.

* * * * *